United States Patent
Dang et al.

(10) Patent No.: US 6,574,183 B2
(45) Date of Patent: *Jun. 3, 2003

(54) DEVICE FOR READING FROM OR WRITING TO OPTICAL RECORDING MEDIA

(75) Inventors: Lieu Kim Dang, Villingen-Schwenningen (DE); Christoph Dietrich, Villingen-Schwenningen (DE); Hartmut Richter, Villingen-Schwenningen (DE); Heinz-Jörg Schroeder, Villingen-Schwenningen (DE)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/108,744

(22) Filed: Mar. 28, 2002

(65) Prior Publication Data

US 2002/0101813 A1 Aug. 1, 2002

Related U.S. Application Data

(63) Continuation of application No. 09/288,390, filed on Apr. 8, 1999, now Pat. No. 6,430,141.

(30) Foreign Application Priority Data

Apr. 14, 1998 (DE) .......................... 198 16 195
May 4, 1998 (DE) .......................... 198 19 607
Jun. 5, 1998 (DE) .......................... 198 25 208

(51) Int. Cl.$^7$ .................................................. G11B 7/00
(52) U.S. Cl. ................ 369/118; 369/44.24; 369/112.28
(58) Field of Search .......................... 369/44.42, 44.41, 369/44.25, 118, 112.08, 112.09, 112.11, 112.18, 112.13, 44.23

(56) References Cited

U.S. PATENT DOCUMENTS 6,275,463 B1 * 8/2001 Nagata et al. ........... 369/44.42

* cited by examiner

Primary Examiner—Nabil Hindi
(74) Attorney, Agent, or Firm—Joseph S. Tripoli; Joseph J. Laks; Reitseng Lin

(57) ABSTRACT

The present invention relates to a device for reading from or writing to optical recording media, which device has a scanning beam generation means, a focusing means and a photodetector comprising at least two detector zones and serving to receive zeroth- and first-order diffraction beams from the recording medium. The object of the invention is to obtain a reduction in interfering influences in a signal derived from signals of the photodetector, a signal such as, for example, a focus error signal or a track error signal. This object is achieved by virtue of the fact that a beam splitting means is provided, which splits a light spot falling onto the photodetector into two separate partial spots. The device is, for example, a CD or DVD player, but in particular a recording and reproduction device for so-called DVD-RAMs or similar optical recording media.

19 Claims, 6 Drawing Sheets

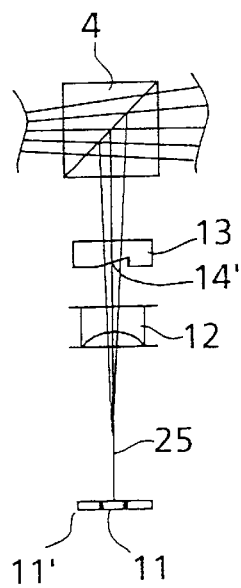
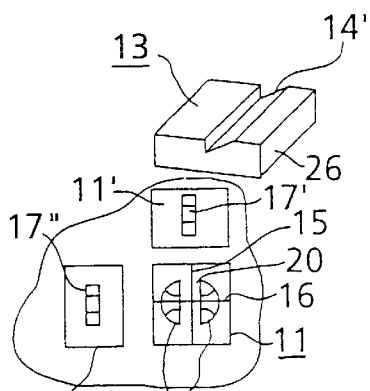
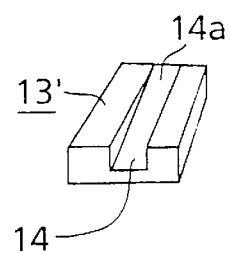
Fig.6   Fig.6b   Fig.6c
Fig.6a
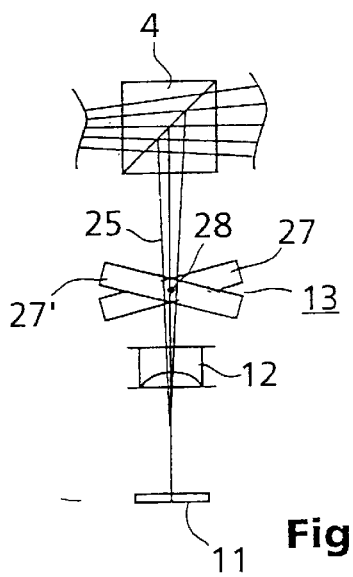
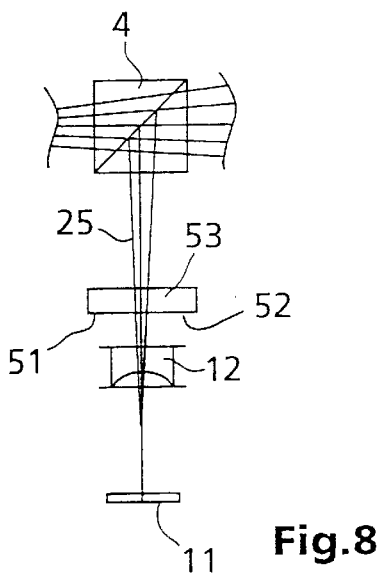
Fig.7   Fig.8
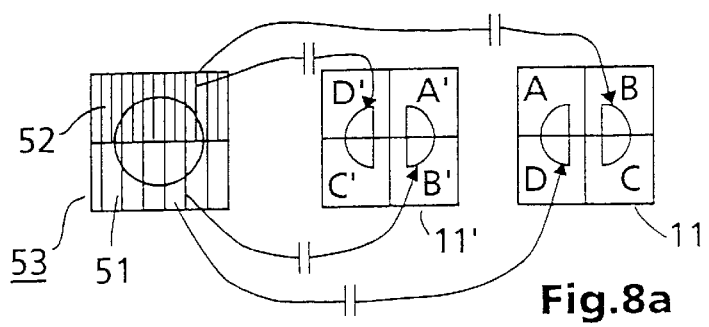
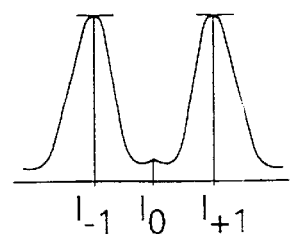
Fig.8a   Fig.8b

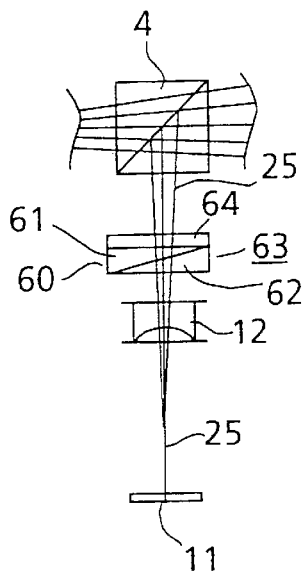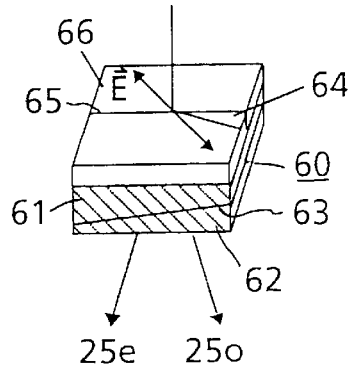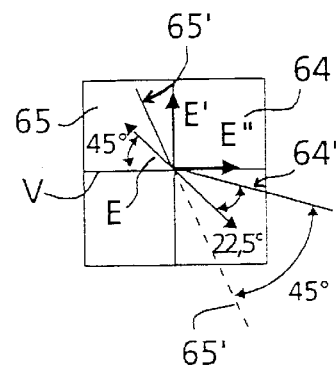
Fig.9       Fig.9a       Fig.9b
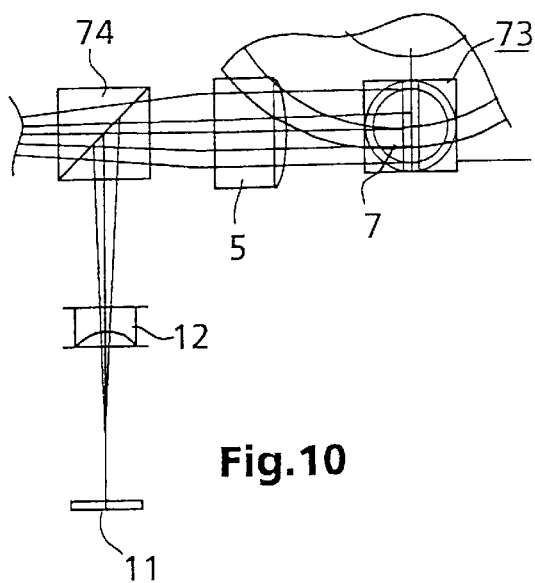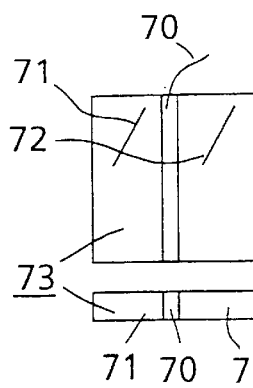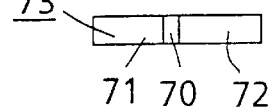
Fig.10       Fig.10a
Fig.10b

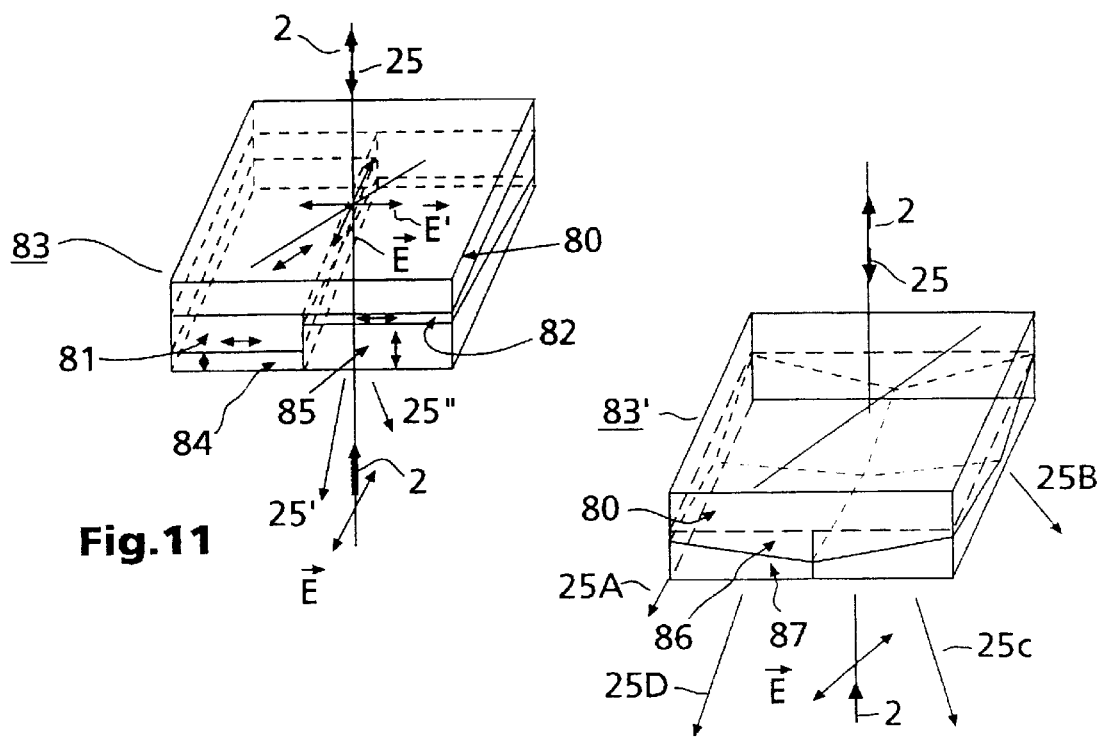
Fig.11
Fig.12
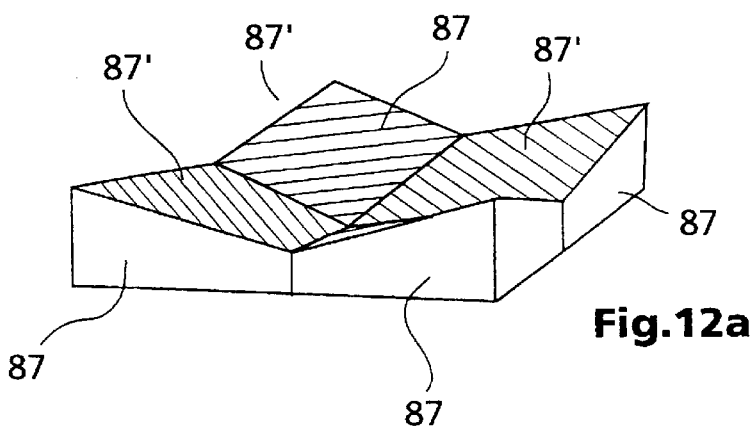
Fig.12a
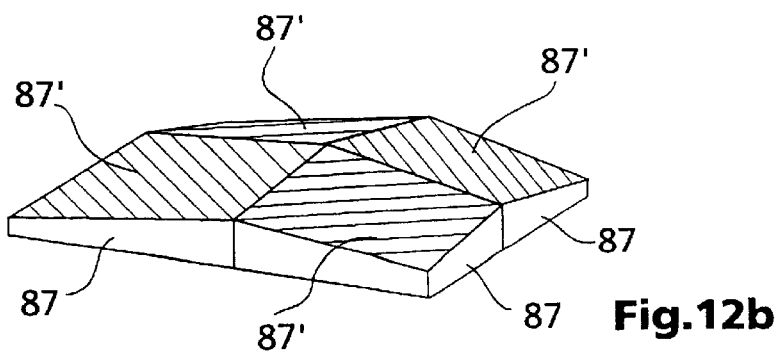
Fig.12b

DEVICE FOR READING FROM OR WRITING TO OPTICAL RECORDING MEDIA

Continuation of prior application Ser. No. 09/288,390 filed Apr. 8, 1999, now U.S. Pat. No. 6,430,141.

FIELD OF THE INVENTION

The present invention relates to a device for reading from and/or writing to optical recording media in which both zeroth-order and first-order diffraction beams fall onto a photodetector.

BACKGROUND OF THE INVENTION

Devices of this type have the disadvantage that in some instances complex diffraction patterns are produced on the photodetector on account of the superposition of the zeroth- and plus/minus first-order diffraction beams, which diffraction patterns have undesirable interfering influences on signals derived from the output signals of the photodetector even in the event of slight displacement of the beam incident on the photodetector relative to the optical axis.

SUMMARY OF THE INVENTION

The object of the invention is to obtain a reduction in the interfering influences in a signal derived from photodetector signals, a signal such as, for example, a focus error signal, in particular one obtained by the astigmatism method, or a track error signal. In this case, the interfering influences can be caused, inter alia, by the superposition of diffraction beams of the zeroth and first or higher diffraction order, by the displacement of the light spot on the photodetector as a consequence of desired or undesired displacement of one or more optical elements relative to the optical axis, or by a combination of these or further interfering influences, for example ones governed by the design.

This object is achieved by means of the measures specified in independent claims.

According to the invention, a beam splitting means is provided, which splits the light spot falling onto the photodetector into two separate partial spots. In this case, this beam splitting means is advantageously arranged in the beam path upstream of the photodetector and generates two partial beams which engender mutually separate light spots on the photodetector. This has the advantage that the partial spots in each case illuminate areas of identical size in different detector zones even in the event of relative displacement with respect to the optical axis. Situated between the partial spots is an unilluminated boundary zone, which advantageously coincides with a boundary between two detector zones, with the result that although the boundary zone is displaced in the event of displacement of the light spot essentially perpendicularly with respect to the said boundary, the boundary nonetheless remains in the unilluminated boundary zone. The detector zones separated by the boundary thus receive an unchanged intensity component even in the event of displacement of the light spot; an interference component in the derived signal is not event brought about in the first place. The optical recording medium is generally in the form of a disc and provided with an information-carrying layer. This layer usually has concentrically or spirally arranged information tracks having a predetermined distance from one another and a predetermined depth. Arranged on the information track are information items in the form of elongate elements of greater or lesser length, which are also called spots or pits, and which may be depressions, elevations and be reflective to a greater or lesser extent or have optically different properties in another suitable manner. The scanning beam generation means generally has a laser diode and corresponding optical elements. The focusing means serves to focus the scanning beam on an information-carrying layer of the optical recording medium. It is often designed, moreover, in such a way that a radial movement, that is to say in a perpendicular direction with respect to the information track, is simultaneously possible for the purpose of tracking the scanning beam on the information track.

According to the invention, the detector zones are separated by a boundary line running in a corresponding manner to the track direction of the recording medium. This has the advantage that a tracking signal can be derived in accordance with the so-called push-pull method, which signal is largely free from interference components that may be caused by a displacement of the light spot relative to the optical axis. In addition to the tracking method mentioned, it is also possible advantageously to employ any other tracking method in which the output signals of the detector zones, which are separated in accordance with the track direction, are combined and evaluated as track error signal. In the case of the method mentioned, the difference zero corresponds to optimal tracking, and a value of greater than or less than zero corresponds to a deviation from the track to the left or right.

According to a further advantageous refinement of the present invention, the device has a photodetector comprising at least four detector elements, and an astigmatism generation means. The astigmatism generation means serves to generate astigmatism in the beam falling onto the photodetector, which enables a focus error signal to be generated. With optimal focusing of the scanning beam onto the recording medium, a circular light spot is produced on the photodetector. In the event of defocusing, the light spot assumes an elliptical form. Therefore, the photodetector has four detector elements generally arranged as four quadrants, the output signals from diagonally opposite detector elements being combined and the difference between the diagonal sums being used as the focus error signal. The astigmatism generation means is a cylindrical lens, for example, but in this case it is also possible, however, to use any other element which generates corresponding astigmatism in the beam falling onto the photodetector. One advantage of this refinement is that a focus error signal is obtained in accordance with the astigmatism method, which signal is largely free from interfering influences caused by movement of the light spot relative to the photodetector. Such movements of the light spot can generally be caused by undesired displacement of one or more optical elements from the respectively optimal position. This is governed for example by ageing, temperature expansion or by sub-optimal adjustment or the like.

According to the invention, the beam splitting means has a light-influencing strip. This has the advantage that it becomes possible to separate the beam into two partial beams in a simple manner, the boundary zone of the photodetector not being covered by any of the partial beams. The light-influencing strip is advantageously an opaque strip; the boundary zone of the photodetector is thus shaded. The opaque strip is arranged in the beam path from the recording medium to the photodetector, to be precise parallel or perpendicular to the track direction and, at the same time, parallel to a boundary between two detector zones of the photodetector, a so-called "dark line".

However, the light-influencing strip that is provided may likewise be a light-deflecting strip. An advantageous variant consists in designing the strip as a prism. That component of the light beam which falls onto the prism is deflected onto a zone situated outside the photodetector, as a result of which it is likewise possible to obtain shading of the boundary zone. Such a light-deflecting strip is inexpensive to produce.

A further advantageous variant of a light-influencing strip consists in arranging polarization-influencing elements adjoining the strip, while the strip itself has no influence on the polarization of the light passing through it. The light whose polarization is uninfluenced can then be filtered out by means of an analyser. Polarization-influencing elements are, for example, quarter- or half-wave plates which convert linearly polarized light into circularly polarized light or rotates the polarization direction. The analyser used is, for example, a polarization filter, a polarizing beam splitter or another suitable optical element.

It is advantageous for the beam splitting means, in this case the light-influencing strip, in particular, to be situated between a beam splitter and the astigmatism-generating element. This has the advantage that the beam falling onto the recording medium is uninfluenced by the beam splitting means and even that part of the beam path which lies downstream of the astigmatism generation means is uninfluenced by the beam splitting means. The beam splitter serves to deflect the reflected beam coming from the recording medium in the direction of the photodetector, which subsequently falls onto the astigmatism generation means. Consequently, only the returning beam is situated between the beam splitter and astigmatism generation means. The said returning beam is advantageously split by the beam splitting means before it falls onto the astigmatism generation means. Arranging the beam splitting means after the passing-through of the astigmatism generation means could have an interfering influence on the wavefront of the astigmatic beam and hence a negative influence on the determination of the focus error signal.

According to a further aspect of the invention, the beam splitting means has a double prism. The double prism advantageously comprises two identical prisms which have a small angle and are joined together e.g. by cementing. The prisms are advantageously produced in one piece, for example by means of a casting moulding process from molten material or by means of induced polymerization. The advantage of a double prism is that the pencil of rays is divided into two equal halves, that is to say no shaded zone occurs, and, consequently, the total intensity of the beam coming from the recording medium falls onto the detector zones.

The double prism can either form the beam splitting means by itself or additionally be combined with one or more other optical elements. The latter case has the advantage that the combination reduces interfering effects and/or intensifies desired effects.

According to a further refinement of the invention, the beam splitting means has a polarizing screen. The screen preferably has a polarizing strip. This has the advantage that the polarization property of the laser beam whereby the laser beam is linearly polarized is utilized. Therefore, the polarizing screen can also be arranged in that zone of the beam path which lies upstream of the reflection of the scanning beam at the recording medium, without this part of the beam being adversely affected. The beam splitting means is thus arranged nearer to the recording medium or to the focusing means, which enables more accurate positioning with respect to the optical axis and consequently results in better interference signal suppression properties. It is advantageous for a quarter-wave plate to be arranged downstream of the polarizing screen, which plate ensures that the linearly polarized light incident on it has a polarization direction rotated through 90° after passing through it on the outward and return paths, the said light, which was allowed to pass through the polarizing screen on the outward path without being influenced, consequently being screened out by the said polarizing screen on the return path in accordance with the configuration of the said screen.

The beam splitting means is advantageously formed by two plane-parallel plates arranged at an angle with respect to one another. This has the advantage that the two partial beams run in a quasi parallel-displaced manner spaced apart from one another. The total light energy thus falls onto the detector; no shading loss occurs. The plates are arranged such that they are tilted at a relatively acute angle with respect to one another. A corresponding effect can likewise be obtained by means of prisms arranged such that they are tilted with respect to one another.

According to a further variant of the invention, the beam splitting means is a double grating element. In this case, two optical gratings having different grating parameters are arranged parallel to one another and perpendicularly to the boundary line of the photodetector. The gratings are designed in such a way that the first-order diffraction beams have a significantly greater intensity than the zeroth-order diffraction beams. As a result of the different grating parameters, the first-order diffraction beams of different gratings have different diffraction angles, as a result of which splitting into partial beams is achieved. Optical gratings have the advantage that they can be produced inexpensively and with high precision.

According to the invention, the beam splitting means has a half-wave plate and a Wollaston prism. The said half-wave plate serves to rotate the polarization direction of part of the incident light beam, while the polarization direction of the other part remains unchanged. It is likewise possible here to combine two half-wave plates in a suitable manner. The Wollaston prism is oriented in such a way that one partial beam leaves the Wollaston prism as the ordinary ray and the other partial beam leaves the Wollaston prism as the extraordinary ray, the said partial beams leaving the said Wollaston prism at an angle with respect to one another. This arrangement also has the advantage that it can be produced inexpensively.

An advantageous development of the invention provides for a further photodetector to be provided for the purpose of detecting further partial spots. This has the advantage that screened-out components of the light beam which lie outside the actual photodetector can be utilized to form further signals, for example to form an HF or data signal. The total available intensity which can be evaluated is thus optimally utilized.

The invention provides for the beam splitting means to be arranged such that it is adjustable in the beam path. This has the advantage that it can be adapted to changed ambient conditions, such as, for example, temperature influence, ageing, displacement of the optical components relative to one another, for example due to the influence of an impact or the like. In this case, the adjustment can be carried out at intervals, if appropriate by means of manual or partly automated adjustment intervention, or else in automated fashion at intervals of greater or lesser duration.

Consequently, further improved interference signal suppression is obtained; adjustment of the beam splitting means can be carried out more easily than the readjustment of what may be a plurality of optical components with respect to one another. The adjustable beam splitting means is advantageously an electrically drivable element which, if appropriate, also manages without mechanically moving parts. An appropriate example here is a liquid-crystal element having a plurality of strip elements which can be darkened independently of one another and have an appropriately small dimension. This enables adjustment both of the position and of the width of the strip that can be darkened. Self-adjustment of the beam splitting means is also possible, for example by means of coupling to a component which influences the displacement of the light spot with respect to the optical axis. This makes it possible to effect a compulsory displacement of the position of the beam splitting means with respect to the optical axis. It is advantageous for the coupling to be such that the symmetry of the partial light spots on the detector zones is as great as possible in every pertinent operating state.

A further refinement of the present invention provides for the beam splitting means to be a beam splitting means which splits the light spot into a plurality of partial spots. In this case, two, four, six or else a higher number of partial light spots are generated. An odd number of partial light spots also lies within the scope of the invention. The splitting into a plurality of partial light spots has the advantage that the boundary zones situated between the partial spots cover a plurality or else all of the boundaries between neighbouring detector zones or detector elements, with the result that in the event of a displacement of the light spot in any direction, a displacement of the intensity distribution on the individual detector zones or detector elements, the said displacement affecting the individual detector signals, does not occur since the partial spots in each case remain completely on the detector partial-zone assigned to them. Any reduction that may be caused by the beam splitting means in the respective intensity of the light falling onto the photodetector is negligible in comparison with the advantage of the reduction in interference components in signals derived from the photodetector.

According to the invention, the beam splitting means is coupled to another optical element of the device. This has the advantage of simple production without any additional outlay in terms of assembly and adjustment, and also of integration in existing designs without difficulty. For example, a strip of the beam splitting means is in this case arranged on the surface of a lens.

The invention further provides for the double prism to have at least one double-refracting prism. This has the advantage that the splitting is possible by way of the polarization of the light. The plane of polarization is rotated for example by a half-wave plate which is passed through twice.

The method claim specifies an advantageous method for a device according to the invention. In this case, too, advantageous developments present themselves, in a similar manner to that specified for the apparatus claims.

Further advantages of the invention also emerge from the following description of the exemplary embodiments. In this case, this description serves to elucidate the invention, which is not restricted to the exemplary embodiments.

BRIEF DESCRIPTION OF THE DRAWINGS

FIG. 6 shows the beam path of a device according to the invention in accordance with a fifth embodiment.

FIGS. 6a, 6c show beam splitting means having strips in prism form in a spatial illustration.

FIG. 6b shows the light spot distribution on the photodetectors in accordance with the fifth embodiment.

FIG. 7 shows the beam path of a device according to the invention in accordance with a sixth embodiment.

FIG. 8 shows the beam path of a device according to the invention in accordance with a seventh embodiment.

FIG. 8a shows a diagrammatic illustration of the splitting of the light beams in accordance with FIG. 8.

FIG. 8b shows the intensity distribution of a grating used in the seventh exemplary embodiment.

FIG. 9 shows the beam path of a device according to the invention in accordance with an eighth embodiment.

FIG. 9a shows the beam splitting means of FIG. 9 in a spatial illustration.

FIG. 9b shows the illustration of polarization direction and optical axes for a configuration in accordance with FIG. 9.

FIG. 10 shows the beam path of a device according to the invention in accordance with a ninth embodiment.

FIG. 10a shows the beam splitting means of FIG. 10 in plan view.

FIG. 10b shows the beam splitting means of FIG. 10 in a lateral illustration.

FIG. 11 shows beam splitting means in accordance with a tenth embodiment.

FIG. 12 shows beam splitting means in accordance with an eleventh embodiment.

FIG. 12a shows a partial view of FIG. 12.

FIG. 12b shows an alternative embodiment to FIG. 12a.

DETAILED DESCRIPTION OF PREFERED EMBODIMENTS

Figure 1:
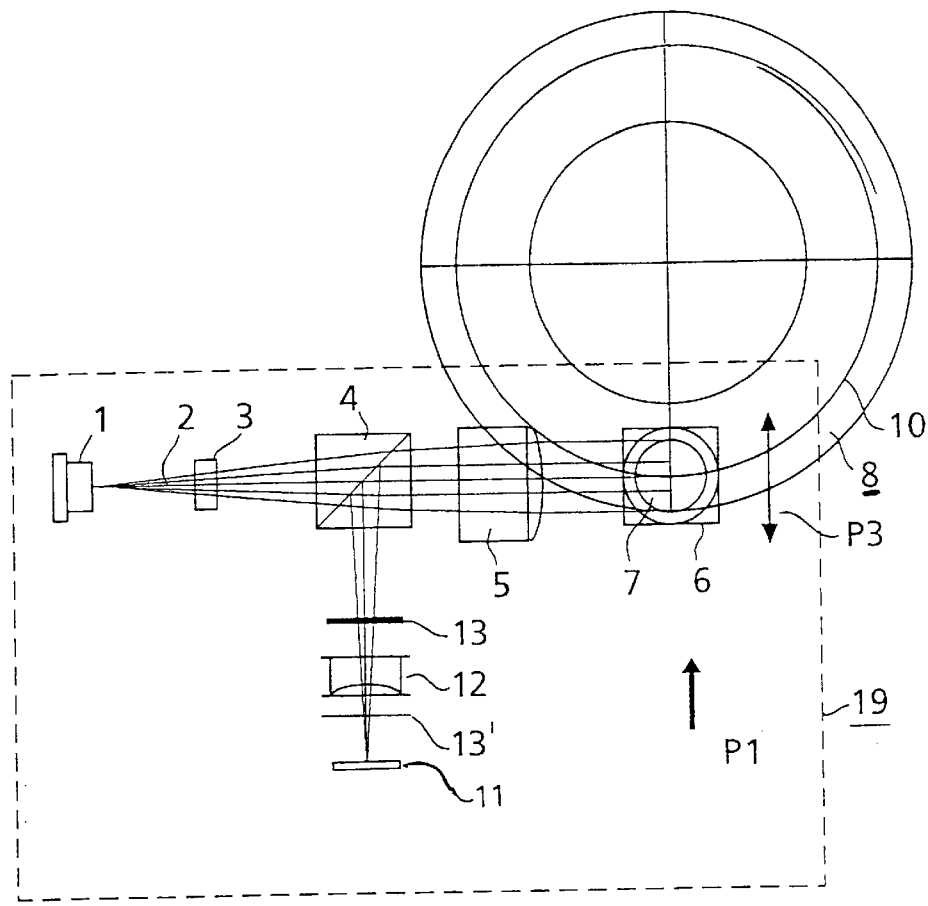
FIG. 1 shows the beam path of a device according to the invention in accordance with a first embodiment.
Figure 1A:
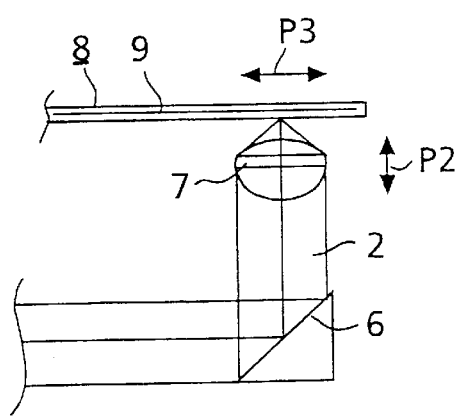
FIGS. 1a,1b show side views of partial zones of FIG. 1.

FIG. 1 shows the beam path of a device according to the invention in accordance with a first embodiment of the invention, in diagrammatic form. A laser diode 1 generates a linearly polarized scanning beam 2, which firstly passes through a grating element 3 and a non-polarizing beam splitter 4 and passes to a collimator 5, which it leaves as a parallel beam. The latter is deflected by a deflection mirror 6 onto the objective lens 7, which focuses the scanning beam 2 onto the optical recording medium 8. Deflection mirror 6, objective lens 7 and recording medium 8 lie one above the other in the view of FIG. 1; their contours are illustrated with no account being taken of any overlap. FIG. 1a shows a side view of this zone of FIG. 1 in the direction of the arrow P1.

It is evident that the deflection mirror 6 deflects the scanning beam 2 by 90°. The objective lens 7 focuses the scanning beam 2 onto an information layer 9 of the recording medium 8. For the purpose of focusing, the objective lens 7 is arranged such that it can be moved by means of a focus drive (not illustrated here) in the perpendicular direction to the optical recording medium 8. This direction of movement is indicated by the arrow P2. The objective lens 7 can be moved in the radial direction with respect to the recording medium 8 by means of a further drive device (likewise not illustrated here). The corresponding direction of movement is indicated by the arrow P3. Arrow P3 is also included in FIG. 1.

Part of the information track 10, specifically somewhat more than would correspond to one revolution of the recording medium, is represented in an exaggerated enlarged form by way of example in FIG. 1. At the upper edge of FIG. 1 it is evident that the information track 10 runs spirally in the case of the recording medium 8 represented. In the lower region of the recording medium 8 it is evident that the direction of movement of the objective lens 7 runs perpendicularly to the information track 10, in accordance with arrow P3. The interaction of rotation of the recording medium 8 and displacement of the objective lens 7 in the radial direction in accordance with arrow P3 enables the entire information track 10 to be scanned.

The light reflected from the recording medium 8 passes in turn through the objective lens 7 to the deflection mirror 6 and is deflected to the photodetector 11 by the beam splitter 4. A concave cylindrical lens 12 is arranged as an astigmatism generation means between the beam splitter 4 and the photodetector 11. Furthermore, in accordance with the invention, a beam splitting means 13 is arranged between the beam splitter 4 and the photodetector 11, which beam splitting means is advantageously arranged between the beam splitter 4 and the cylindrical lens 12 but it may also be arranged between the cylindrical lens 12 and the photodetector 11, as is indicated as an alternative for the beam splitting means 13'.

The beam splitting means 13' is arranged as near as possible to the cylindrical lens 12. Alignment of the beam splitting means 13' with the beam cross section elliptically deformed by the cylindrical lens 12 is avoided in this way. Such alignment and, if appropriate, special adaptation of the beam splitting means 13' are necessary when the distance from the cylindrical lens 12 is larger.

Figure 1B:
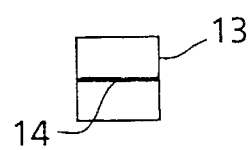

FIG. 1b shows a side view of the beam splitting means 13 in the viewing direction corresponding to arrow P1. It is evident in this case that an opaque strip 14 runs transversely through the beam splitting means 13, the said strip running parallel to the information track 10 in the figure, that is to say in the read-out direction. In accordance with another embodiment of the invention, however, an arrangement of the opaque strip 14 which is perpendicular to this is likewise provided.

The components 1 to 7 and 11 to 13 are part of a scanning unit 19, which can likewise be moved in the direction of the arrow P3 and, consequently, enables tracking from the inner to the outer edge of the information-carrying zone of the recording medium 8, this being referred to as course tracking, while the objective lens 7 executes only relatively small displacements in the direction of the arrow P3, corresponding to fine regulation of the tracking. The scanning unit 19 is diagrammatically indicated by a dashed rectangle.

Figure 2A:
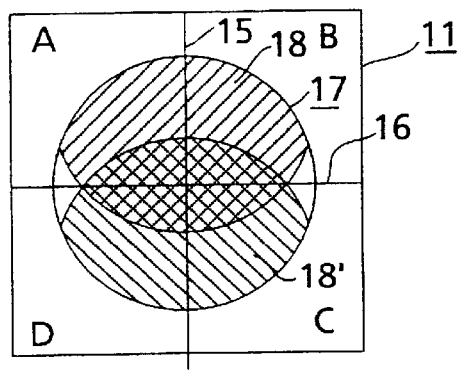
FIGS. 2a–2g show the light spot distribution on the photodetector of a device according to the invention in different situations.

FIG. 2a shows the light spot distribution on the photodetector 11 of a device according to the invention. In this case, the photodetector 11 is represented in the direction opposite to that of the arrow P1 from FIG. 1. The photodetector 11 comprises four detector elements A to D. The boundaries 15 and 16 between the individual detector elements A to D run perpendicularly and parallel, respectively, to the direction of the information track and are also referred to as "dark line". The light spot falling onto the photodetector 11 is composed of a circular light spot, caused by a zeroth-order diffraction beam, and the light spots 18, 18', which are bounded by in each case two circle segments, corresponding to ±first-order diffraction beams. The light spots 18, 18' are shown hatched and overlap in the central region in the image. It ought to be noted that this illustration does not correspond to the intensity of the light spot since this results from a complicated interference pattern of the light spots 17, 18 and 18' superposed on one another. All that it is intended to illustrate is that superposition of the reflected diffraction beams, and thus interference, occur. The splitting of the scanning beam 2 into zeroth- and ±first-order reflected beams is brought about by the structure of the information layer 9, in particular the depth and the spacing of the neighbouring parts of the information track 10. The neighbouring parts of the information track 10 form an optical grating which causes the reflected beam to be split into zeroth-order, ±first-order and, if appropriate, higher-order beams. The geometrical conditions as well as the optical parameters of the recording medium 8 and of the device, in particular of the objective lens 7, are related to one another such that the zeroth- and ±first-order diffraction beams are superposed on the photodetector 11. This situation manifests itself for example with a recording medium 8 corresponding to a DVD-RAM, which recording medium is read out with a read-out wavelength of about 650 nm and has a track width of 0.8 $\mu$m and a track depth of about one sixth of the read-out wavelength. In this case, the numerical aperture of the objective lens 7 is 0.6. On the basis of these parameters, areas of the first-order diffractions at the periodic structure of the recording medium 8 are so large that they overlap one another. Moreover, the depth of the information track 10 is optimized such that a push-pull track error signal formed from it and used for tracking is as large as possible. This signal is composed of TEPP=(A+B)−(C+D), where the letters A to D denote the signals emitted by the corresponding detector elements A to D. If the focused scanning beam 2 is precisely centred on an information track 10, then the sums (A+B) and (C+D) are of identical magnitude. If the said beam deviates from the centre of the track, then the said sums assume different values. The track error signal TEPP then becomes not equal to zero. It is fed as error signal to a track regulating circuit which activates the drive of the objective lens 7 in the radial direction corresponding to arrow P3.

Arranged along the information track 10 are elongate information elements, so-called pits, which bring about modulation of the intensity of the reflected light on account of their optical properties. This may be caused, on the one hand, by interference on account of optical path differences, by different reflectivity or by other suitable parameters. When a track is being followed, it emerges from this that the intensity distribution of the interference pattern forming the light spot 17 is produced. This intensity distribution engenders, as considered for a particular point of the light spot, a signal which can be designated as sine-like. A focus error signal FE generated in accordance with the astigmatism method results from the difference between the diagonal sums of the detector elements as FE=(A+C)−(B+D). If the focused scanning beam 2 falls onto the photodetector 11 in a precisely centred manner, as is illustrated in FIG. 2a, then the intensities of the first-order light spots 18, 18' are distributed symmetrically over the axis in accordance with the boundary 15 and the modulations in the track error signal TEPP have no influence on the focus error signal FE. In this case, an interference component, also designated as crosstalk, does not occur in the focus error signal FE. This applies even when the position of the photodetector 11 and the light spot 17 relative to one another is displaced in the parallel direction towards the boundary 15. It occurs, for example, when the objective lens 7 is displaced in the direction of the arrow P3.

Figure 2B:
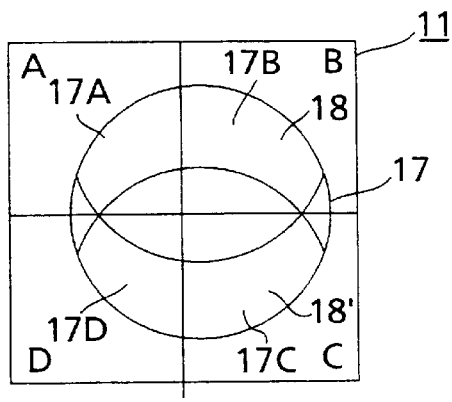

If the photodetector 11 and the light spots 17, 18, 18' are displaced relative to one another perpendicularly to the direction of the boundary 15, then the areas of the partial light spots 17A, 17A falling onto the detector elements A and B are smaller than the areas of the partial light spots 17B, 17C falling onto the detector elements B and C. For the sake of simplicity, the partial light spots are designated by the reference symbols 17A–17D even though they also contain components from the diffraction beams 18, 18'. This is indicated in FIG. 2b, and corresponds to a situation occurring in reality. This situation is caused inter alia by ageing-dictated displacement of the position of individual optical components relative to one another, displacements governed by temperature fluctuations, or other external influences. In addition, not completely exact adjustment during the production of the device can entail a corresponding effect. The hatching of the first-order light spots 18, 18' has been dispensed with in FIG. 2b.

Through the modulation of the track error signal TEPP, the diagonal sums (A+C) and (B+D) are also modulated non-uniformly, even if the focusing is optimal. The result of this is that the focus error signal FE likewise exhibits modulations which do not correspond to the real focus error but rather to crosstalk of other signals. This can lead to considerable interference with the dynamic behaviour of the focus regulating circuit. In practice, the photodetector 11 is not always centred centrosymetrically with respect to the light spot 17, that is to say the optical axis, for example for one of the reasons mentioned above. A degree of eccentricity of the optical recording medium 8 means that during each revolution of the recording medium 8, the objective lens 7 executes a reciprocating radial movement in order to keep the focused scanning beam 2 on the information track 10. The consequence of this is that the light spot 17 and the light spots 18, 18' also move correspondingly relative to the photodetector 11. This movement parallel to the direction of the boundary 15, which has no influence on the focus error signal FE in the event of a light spot 17, 18, 18' centred with respect to the boundary 15, amplifies the interfering influence of the focus error signal FE in the event of a light spot 17, 18, 18' offset perpendicularly to the direction of the boundary 15, as illustrated in FIG. 2b. A corresponding interfering influence also occurs when information tracks 10 are traversed in the radial direction, for example in the event of a jump from one title stored on the recording medium 8 to the next title.

Figure 2C:
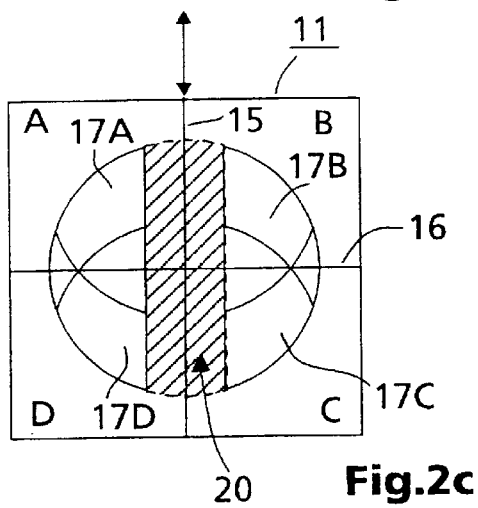

The beam splitting means 13 provided according to the invention ensures that the partial light spots 17A–17D on the detector elements A to D are kept the same size in all the abovementioned cases or conceivable cases. The opaque strip 14 of the beam splitting means 13 is fitted in the beam path on the return path from the recording medium 8 to the photodetector 11 in such a way that it runs parallel to the movement of the objective lens 7 and, at the same time, parallel to the boundary 15 of the detector 11. The strip 14 is adjusted in such a way that the partial light spots 17A, 17B on the detector elements A and B and the partial light spots 17C, 17D on the detector elements C and D have the same size in each case. This is illustrated in FIG. 2c. The width of the strip 14 is chosen such that the shading 20 caused by it on the photodetector 11 is greater than the maximum displacement of photodetector 11 and light spot 17 relative to one another that occurs in practice, especially in the direction perpendicular to the boundary 15. It is advantageous for the strip 14 not to be arranged on an element additionally arranged in the beam path but rather to be coupled to an element which is situated in the beam path in any case. For example, the strip 14 may advantageously be arranged on the surface of a focusing lens.

Figure 3:
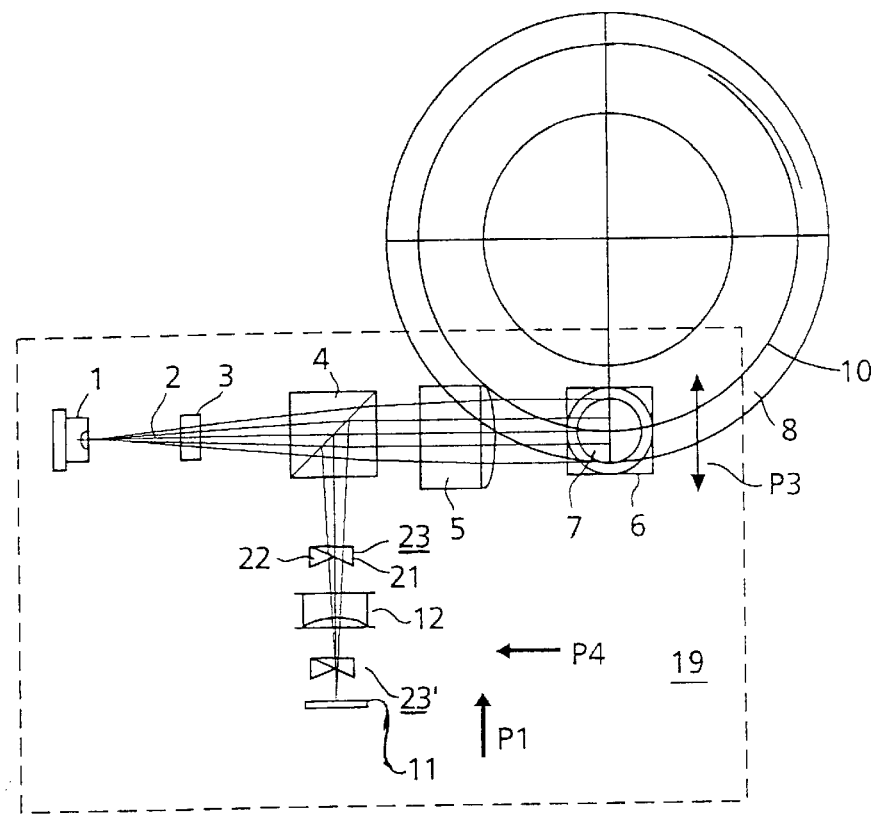
FIG. 3 shows the beam path of a device according to the invention in accordance with a second embodiment of the invention.

FIG. 3 shows the beam path of a second device according to the invention. Identical reference symbols are used for elements identical to those in FIG. 1; a more detailed explanation is given only insofar as there is a difference from FIG. 1.

Figure 3A:
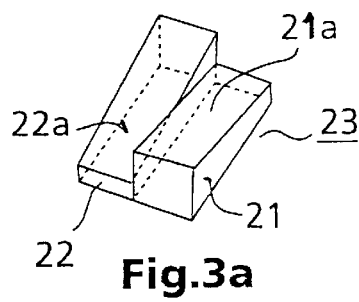
FIGS. 3a, 3b show views of partial zones of FIG. 3.

It is evident that a double prism 23, 23' is provided instead of the beam splitting means 13. In this case, too, the arrangement of the double prism 23 constitutes the preferred embodiment relative to that of the double prism 23'. FIG. 3a shows a spatial view of the double prism 23.

Figure 2D:
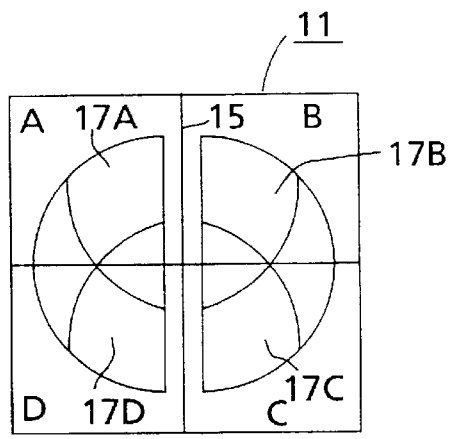
Figure 2E:
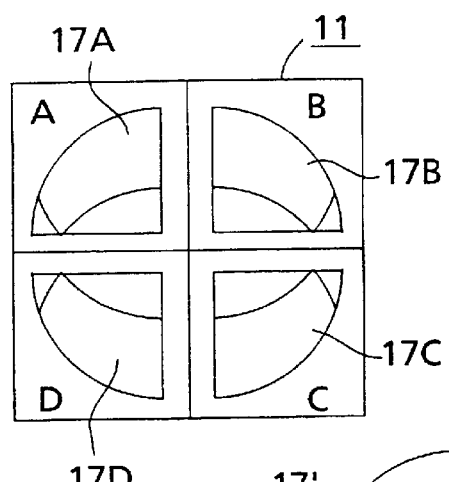
Figure 2F:
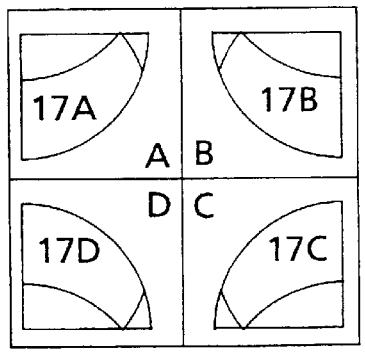
Figure 2G:
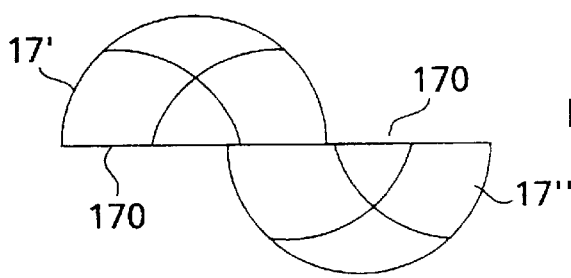

The double prism 23 consists of two identical prisms 21, 22, which abut one another at their triangular side faces and whose slanting faces 21a, 22a are inclined oppositely with respect to one another. What is firstly achieved in this case, as illustrated in FIG. 2g, is that the beam is split into two partial beams with a semicircular cross section 17', 17", which are displaced relative to one another in the direction of their straight edge 170. The two partial beams are tilted with respect to the optical axis, that is to say the rectilinear continuation of that part of the beam which lies upstream of the beam splitting means 23. The cylindrical lens 12, whose cylinder axis is tilted by 45° with respect to a line corresponding to the track direction, now generates astigmatism in the split beam, which is divergent with regard to the partial beams. In this case, the partial beams are influenced separately from one another on account of their different angles of incidence on the cylindrical lens 12. This influence is such that in the plane of the detector 11, the cross sections 17', 17" of the partial beams are rotated through 90° in each case with respect to the illustration in FIG. 2g. In this case, the point of rotation corresponds approximately to the central point of the respective edge 170. Therefore, a light spot distribution corresponding to FIG. 2d occurs on the detector 11.

Figure 3B:
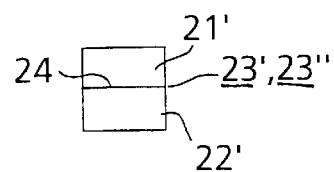

FIG. 3b shows a view of the double prism 23, 23' in the viewing direction of the arrow P1. The double prism 23, 23' has the effect of splitting the incident light pencil into two halves which fall onto the photodetector 11 symmetrically with respect to the boundary 15. This is illustrated in FIG. 2d.

No shading occurs according to this exemplary embodiment; the sum of the intensities of the partial light spots 17A, 17B, 17C, 17D produces the total intensity of the light spot 17; the same applies correspondingly to the light spots 18 and 18'.

In the event of a movement of the photodetector 11 and the optical axis relative to one another, the unilluminated zone between the partial light spots 17A and 17B and also that between the partial light spots 17C and 17D remain undisplaced relative to the partial light spots 17A 17B, 17C, 17D. If a widening of the boundary 15, the so-called dark line, were performed instead of the inventive splitting into partial light spots, then the said boundary would remain undisplaced relative to the photodetector 11, whereas the intensity distribution would be displaced relative to the photodetector 11. Consequently, a widening of the dark line cannot obtain the effect, obtained by the present invention, of the identical size of the partial light spots and hence the intensity distribution which is constant with regard to relative displacement.

Figure 4:
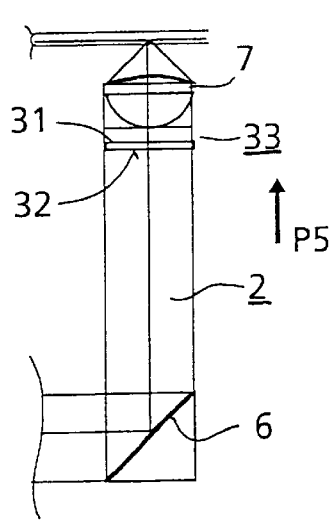
FIG. 4 shows the beam path of a device according to the invention in accordance with a third embodiment.

FIG. 4 shows an exemplary embodiment of the invention in which the beam splitting means 33 has a polarizing screen 32. Only the region corresponding to FIG. 1a is illustrated here, the other components of the device corresponding to those described in FIG. 1, with the exception of the beam splitting means 13, 13' replaced by the beam splitting means 33.

Figure 4A:
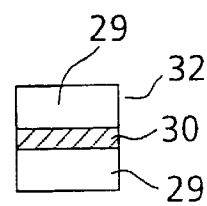
FIG. 4a shows a side view of a partial zone of FIG. 4.

FIG. 4A shows a plan view of the polarizing screen 32 in the viewing direction of the arrow P5. It is possible to discern a hatched polarizing strip 30, which is arranged centrally and is adjoined by non-polarizing zones 29. The width of the strip 30 is chosen in the same way as described for the strip 14 of the first exemplary embodiment.

In addition to the polarizing screen 32, the beam splitting means 33 also has a quarter-wave plate 31. In the example illustrated, both components are arranged in the beam path between the deflection mirror 6 and the objective lens 7. The polarization direction of the polarizing screen 32 corresponds to the polarization direction of the incident scanning beam 2. Therefore, the scanning beam 2 passes through the screen 32 uninfluenced. The optical axis of the quarter-wave plate 31 is arranged at an angle of 45° with respect to the polarization direction of the screen 32. The incident scanning beam 2 passes through the polarizing screen 32 uninfluenced and is converted into circularly polarized light as it passes through the quarter-wave plate 31. After reflection at the recording medium 8, the circularly polarized light beam again passes through the quarter-wave plate 31, and is converted into linearly polarized light. The polarization direction is now perpendicular to the polarization direction of the originally incident beam and hence perpendicular to the polarization of the screen 32. Therefore, the reflected beam can pass through the screen 32 only in the non-polarized zones 29. The further course of the beam corresponds to that described with reference to FIG. 1; the resulting light spot 17 on the photodetector 11 corresponds to that represented with reference to FIG. 2c.

Figure 5:
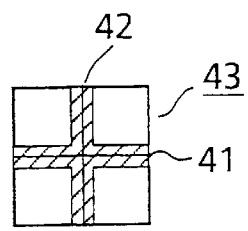
FIG. 5 shows beam splitting means of a fourth embodiment according to the invention, in plan view.

FIG. 5 shows a beam splitting means 43, which has two strips 41 and 42 arranged perpendicularly to one another. The strips 41, 42 are either designed as polarizing strips in accordance with the strip 30 of FIG. 4a, in which case the beam splitting means 43 interacts with a quarter-wave plate 31, for example in the arrangement of FIG. 4. However, the strips 41 and 42 may also be opaque strips, in which case the beam splitting means 43 is then arranged in accordance with the beam splitting means 13, 13' of FIG. 1. The beam splitting means 43 results in the light spot 17 being split into four separate regions, with the result that even a displacement in any arbitrary direction does not lead to a change in the intensity of the light falling onto one of the four detector elements A, B, C, D.

FIG. 6 shows part of the beam path of a device according to the invention in accordance with a fifth embodiment, similar to that described with reference to FIG. 1. Non-polarizing beam splitter 4, cylindrical lens 12 and photodetector 11 correspond to those described with reference to FIG. 1. As strip, the beam splitting means 13 has a prismatic recess 14' with a triangular cross section. The light which passes through the recess 14' is deflected laterally, while the other part of the light beam falls as non-deflected light pencil onto the cylindrical lens 12. In this case, the non-deflected light pencil is influenced by the cylindrical lens 12 in accordance with the shaded light pencil of one of the previous examples. A light spot distribution on the detector 11 in accordance with FIG. 2c occurs in this case. The light pencil deflected by the recess 14' is influenced by the cylindrical lens 12, in a similar manner to that described with reference to FIG. 3d, in such a way that it impinges outside the detector 11 in the plane thereof having been rotated through 90° with respect to a point of rotation lying outside the optical axis. In the exemplary embodiment, the deflected light pencil falls onto a further photodetector 11'; this is illustrated by means of the light spot 17' in the figure.

FIG. 6a shows a spatial illustration of the beam splitting means 13. It is a plate 26 composed of glass or plastic, for example, in which plate a prismatic recess 14' is arranged. The recess 14' is oriented parallel to a boundary 15 or 16 of the photodetector 11 and is situated in the centre of the impinging beam.

FIG. 6c shows an alternative variant as beam splitting means 13'. The latter also has a prismatic recess 14', the slanting face 14a falling away along the longitudinal axis of the recess 14' in this case. The light beam which is deflected thereby is laterally offset due to influencing by the cylindrical lens 12. The said light beam falls onto a detector 11" outside the detector 11 as light spot 17".

FIG. 6b illustrates the light spot distribution on the photodetectors 11, 11', 11". The imaging on photodetector 11 corresponds to that described with reference to FIG. 2c, for which reason fewer details are marked here. The partial light spot 171, 17" formed by the deflected light pencil falls onto the detector 11', 11". The light spot 17', 17" corresponds to the shaded zone 20 on the detector 11. In order to evaluate the total intensity falling onto both photodetectors 11 and 11' or 11", for example in order to recover the information items stored on the recording medium 8, the output signals of both photodetectors 11 and 11' or 11" are utilized.

FIG. 7 shows part of the beam path of a device according to the invention in accordance with a sixth embodiment. Beam splitter 4, cylindrical lens 12 and photodetector 11 correspond to the corresponding parts described with reference to FIG. 1. Two crossed plane-parallel plates 27, 27' are provided as beam splitting means 13. They are tilted relative to one another about a common axis 28, which is perpendicular to the optical axis of the light pencil 25 and perpendicular to the track direction of the recording medium. The effect of the tilting of the plane-parallel plates 27 and 27' with respect to one another is that the partial pencils running through the respective plates 27, 27' in each case emerge from the plate 27, 27' in an approximately parallel-displaced manner, as a result of which splitting into two partial beams is effected. Splitting of the partial beams in a manner corresponding to the cross section illustrated in FIG. 2g occurs upstream of the cylindrical lens 12. A splitting of the light spots 17A and 17D, on the one hand, as well as 17B and 17C, on the other hand, which corresponds to FIG. 2d is produced on the photodetector 11, on account of the action of the cylindrical lens 12.

FIG. 8 corresponds essentially to the beam path described with reference to FIGS. 1, 6 and 7. In this case, corresponding components are provided with the same reference symbols as for FIG. 1. The beam splitting means is designed as a double grating element 53 having the optical gratings 51 and 52. The gratings 51, 52 have different grating constants.

The gratings 51, 52 are designed, by virtue of suitable selection of the grating parameters, in particular grating depth and width, in such a way that the intensity $I_0$ of the zeroth-order diffraction beam is significantly less than the intensities $I_{+1}$ and $I_{-1}$ of the plus/minus first-order diffraction beams. This is indicated diagrammatically in FIG. 8b. The splitting of the light beam 25 into partial beams is indicated, likewise diagrammatically, in FIG. 8a. The assignment of the individual light spots to the respective grating 51, 52 is indicated by connecting arrows. These connecting arrows do not represent the optical path but rather indicate merely the assignment. The double grating element 53 and the photodetector 11 as well as an additional photodetector 11' are represented in this case, each in plan view. The grating constants of the gratings 51 and 52 are selected in such a way that a smaller degree of lateral splitting is effected for the first-order diffraction beams from the grating 51 than for those from the grating 52. Light spot splitting corresponding to that described with reference to FIG. 2d is thus produced on the photodetector 11. Mirror-inverted splitting is produced for the additional photodetector 11', this being indicated by the designation of the detector elements A', B', C', D' in the figure. In order to utilize the intensity as optimally as possible, the mutually corresponding detector elements A and A', B and B', C and C', as well as D and D' are combined and correspondingly evaluated.

FIG. 9 diagrammatically shows the beam path of an eighth exemplary embodiment of the invention; corresponding components are provided with the same reference symbols as for FIG. 1. The beam splitting means 63 has a Wollaston prism 60, comprising two partial prisms 61, 62, and a half-wave plate 64, abbreviated to HWP below. The Wollaston prism 60 has the property of splitting components of an impinging light beam which are polarized perpendicularly and parallel to its preferred direction into divergent partial beams 25o, 25e, which are designated as ordinary partial beam 25o and as extraordinary partial beam 25e. This is illustrated in FIG. 9a. The HWP 64 is arranged in the front half of FIG. 9a. It serves to rotate that component of the beam 25 which impinges upstream of the central line in the image through 90° in terms of its polarization. A glass plate 66 is then arranged on the rear side, and does not influence the polarization. However, it is more advantageous to provide two HWPs 64, 65, which rotate the polarization direction of the incident light pencil 25 through 45° in each case in opposite directions, in order thus to obtain components which are polarized perpendicularly to one another. The optical axes 64', 65' of the HWPs 64, 65 and also the polarization direction E of the incident light pencil 25 are illustrated in FIG. 9b. E' and E" specify the polarization directions of the partial beams respectively leaving the HWPs 65 and 64. In this concrete exemplary embodiment, the polarization direction E of the incident light pencil 25 is tilted at an angle of 45° with respect to a preferred direction V of the Wollaston prism 60. The optical axes 64' 65' of the HWPs 64, 65 are tilted in each case by 22.5° with respect thereto, with the result that the polarization direction is rotated through 45° in each case, and, consequently, the emerging partial beams have the polarization directions E' and E".

FIG. 10 shows a further exemplary embodiment of the invention. In this case, the beam splitting means 73 is arranged near the objective lens 7, in a similar manner to the beam splitting means 33 described with reference to FIG. 4. In this case, too, identical components are provided with the same reference symbols as described previously. The non-polarizing beam splitter 4 of the previous exemplary embodiments is in this case replaced by a polarizing beam splitter 74. The latter conducts, in the direction of the photodetector 11, only those components of the light coming from the recording medium whose polarization direction is rotated through 90° with respect to the scanning beam 2. This rotation of the polarization direction is achieved by means of two quarter-wave plates 71, 72, which are passed through both during the outward travel of the scanning beam 2 to the recording medium and during the return travel. They are part of the beam splitting means 73 and are separated by a neutral strip 70 which leaves the polarization direction uninfluenced. This neutral strip 70 is composed of glass, for example, and has the same optical path length as the quarter-wave plates 71, 72. This is ensured by a suitable selection of the refractive index or the geometrical thickness or a combination thereof. FIG. 10a shows a plan view and FIG. 10b a side view of the beam splitting means 73. The first time they pass through the beam splitting means 73, the partial beams situated to the left and right of the strip 70 are converted from linearly polarized into circularly polarized. The second time they pass through, that is to say after reflection at the recording medium 8, they are converted from circularly polarized into linearly polarized light, the polarization direction being perpendicular to the original polarization direction. Only the component with a perpendicular polarization direction is reflected by the polarizing beam splitter 74 in the direction of the detector 11. That part which has passed through the strip 70 does not reach the detector 11. This solution can be integrated without a high outlay in devices which have a polarizing beam splitter 74 in any case, for example devices for reading from and writing to optical recording media.

FIG. 11 shows a beam splitting means 83 in accordance with a tenth embodiment of the invention. It is arranged in the part of the beam path through which both the scanning beam 2 and the reflected light pencil 25 pass. This is indicated by correspondingly marked arrows. The beam splitting means 83 is preferably arranged at the position of the beam splitting means 33 described with reference to FIG. 1, that is to say in the immediate vicinity of the objective lens 7. The latter is advantageously coupled to the beam splitting means 83.

The beam splitting means 83 has a quarter-wave plate 80, two crystal prisms 81, 82 and two further prisms 84, 85. The prisms 81 and 84 as well as the prisms 82 and 85 each have the same angle and are combined in such a way that they jointly form a plane-parallel plate. The prisms 84, 85 are composed of glass or of another material which is isotropic with regard to the polarization of the light. In particular, they may be in one piece and be composed of moulded plastic. The optical axis and the refractive index of the crystal prisms 81, 82 are coordinated with the polarization direction E of the incident scanning beam 2 and the refractive index of the glass prisms 84, 85 in such a way that the scanning beam passes uninfluenced through the plates formed from the prisms 81, 84 and also 82, 85. Depending on the orientation of the optical axes of the crystal prisms 81, 82, then, the ordinary refractive index thereof or the extraordinary refractive index thereof corresponds to the refractive index of the glass prisms 84, 85.

In accordance with an advantageous refinement, the prisms 84, 85 as well as the prisms 81, 82 are also composed of quartz. This has the advantage that the refractive indices are identical, that is to say do not necessitate any corrections in this regard. In this case, the optical axis of the prisms 84, 85 lies in the direction of the axis of the light pencil 25. In this way, the polarization direction of the light pencil remains uninfluenced by the prisms 84, 85. The optical axes of the prisms 81, 82 lie in the direction of the polarization direction of the incident light pencil. Consequently, there is no influencing with regard to the polarization direction, in particular no double refraction, in this case either. The respective optical axes are indicated by double arrows in the figure.

Once the scanning beam 2 has passed through the prisms 81, 82, 84, 85, from bottom to top in the figure, it passes through the quarter-wave plate 80. Its linear polarization is converted into circular polarization in the process. After reflection of the scanning beam 2 at the recording medium 8, the reflected light pencil 25 passes through the quarter-wave plate 80. The circular polarization is converted into linear polarization in the process, the polarization direction E' now being perpendicular to the original polarization direction E.

The refractive indices of the crystal prisms 81, 82, on the one hand, and those of the prisms 84, 85, on the other hand, are different, therefore, for the light pencil 25. Refraction therefore occurs at the respective transition areas; the reflected light pencil 25 is split into two light pencils 25', 25" in the process. If the prisms 84, 85 are glass prisms whose refractive index corresponds to the ordinary refractive index of the crystal prisms 81, 82, then the light pencils 25', 25" are extraordinary rays, and if it corresponds to the extraordinary refractive index, they are ordinary rays.

After the cylindrical lens 12 has been passed through and after corresponding beam influencing, light spot splitting corresponding to that illustrated in FIG. 2d is produced on the photodetector 11. A loss caused by shading does not occur in this case.

FIG. 12 shows a beam splitting means 83' in accordance with an eleventh embodiment of the invention. It is used instead of the beam splitting means 83 of FIG. 11; corresponding parts are designated by reference symbols corresponding to those for this figure. Prisms 86, 87 are used instead of the prisms 81, 82, 84, 85. Each of the prisms 86, 87 has a rhomboid, inclined roof surface. This is indicated in FIG. 12a, in which only the glass prisms 87 are represented in a spatial illustration. The crystal prisms 86 have a roof surface structure which is complementary thereto. The inclination of the roof surfaces of the prisms 87 with respect to one another is such that the projections of the contour lines 87' onto the base area are perpendicular to one another. The contour lines 87', that is to say the lines of the same height, are indicated in FIG. 12a.

The use of the beam splitting means 83' results in the reflected light pencil 25 being split into four partial light pencils 25A, 25B, 25C, 25D. After the cylindrical lens 12 has been passed through, a distribution on the photodetector 11 in accordance with FIG. 2f occurs. The partial light spots 17A, 17B, 17C, 17D are respectively separated from one another; since no shading occurs, no loss of intensity occurs either.

According to a further refinement of the invention, the prisms 87 are arranged in such a way that in the middle there is not a trough point, as shown in FIG. 12a, but rather a crest point. This is shown in FIG. 12b. The prisms 86 are arranged correspondingly complementarily. An arrangement of this type results in a light spot distribution in accordance with FIG. 2e on the detector 11 after the cylindrical lens 12 has been passed through.

The present invention makes it possible to compensate for interfering influences by the modulation of the superposed zeroth-order light spot 17 and first-order light spots 18, 18' in the event of displacement of the photodetector 11 from the optical axis, without necessitating use of complex components such as polarizing holograms and unconventional detector arrangements. The photodetector 11 used may be, for example, a conventionally constructed four-quadrant detector, as described in the exemplary embodiments. The arrangement of the rest of the optical elements may also be kept relatively simple. The strip 14 or 41, 42 in the beam path on the return path from the recording medium 8 has the effect of "super-resolution", resulting in an improvement in the quality of a data signal which is usually obtained from the sum of the detector signals of the individual detector elements A, B, C, D.

The device according to the invention is, for example, a CD or DVD player, but in particular a recording and reproduction device for so-called DVD-RAMs or similar optical recording media.

What is claimed is:

1. Device for reading from or writing to optical recording media of a type comprising:
    a scanning beam generation means for generating a scanning beam,
    a focusing means for focusing the scanning beam onto the optical recording medium,
    a photodetector comprising at least two detector zones and serving to receive zeroth- and first-order diffraction beams from the recording medium,
    said detector zones being separated by a boundry perpendicular to a direction of movement of the zeroth- and first-order beams relative to the photodetector, and
    a beam splitting means, which splits a light spot falling onto the photodetector into two separate partial spots, characterized in that: the two separate partial spots are separated by an unilluminated boundry zone coinciding with the boundry between the detector zones of the photodetector.

2. Device according to claim 1, characterized in that the detector zones are separated by a separating line running in a corresponding manner to the track direction of the recording medium.

3. Device according to claim 1, characterized in that the device has an astigmatism generation means and the photodetector comprises at least four detector elements.

4. Device according to claim 1, characterized in that the beam splitting means has a light-influencing strip.

5. Device according to claim 3, characterized in that the beam splitting means has a light-influencing strip which is arranged between a beam splitter and the astigmatism generation means.

6. Device according to claim 1, characterized in that the beam splitting means has a double prism.

7. Device according to claim 1, characterized in that the beam splitting means has a polarizing screen.

8. Device according to claim 1, characterized in that the beam splitting means has plane-parallel plates arranged at an angle with respect to one another.

9. Device according to claim 1, characterized in that the beam splitting means is a double grating element.

10. Device according to claim 1, characterized in that the beam splitting means has a half-wave plate and a Wollaston prism.

11. Device according to claim 1, characterized in that a further photodetector is arranged for the purpose of detecting further partial spots.

12. Device according to claim 4, characterized in that a further photodetector is arranged for the purpose of detecting further partial spots.

13. Device according to claim 5, characterized in that a further photodetector is arranged for the purpose of detecting further partial spots.

14. Device according to claim 9, characterized in that a further photodetector is arranged for the purpose of detecting further partial spots.

15. Device according to claim 1, characterized in that the beam splitting means is arranged such that it is adjustable in the beam path.

16. Device according to claim 1, characterized in that the beam splitting means is one which splits the light spot into a plurality of partial spots.

17. Device according to claim 1, characterized in that the beam splitting means is coupled to another optical element.

18. Device according to claim 6, characterized in that the double prism has at least one double-refracting prism.

19. Method for reducing an interference component, in a signal, which is derived from photodetector signals, of an optical scanner for reading from or writing to recording media which are optimized to a single-beam scanning method, comprising the steps of:

providing a photo detector having at least two detector zones and sewing to receive zeroth- and first-order diffraction beams from the recording medium, said detector zones being separated by a boundry perpendicular to a direction of displacement of the zeroth- and first-order beams relative to the photodetector, and providing a beam splitting means which splits a light spot falling onto the photodetector into two separate partial spots, characterized by:

separating the two separate partial spots by an unilluminated boundry zone coinciding with the boundry between the detector zones of the photodetector.

* * * * *